Patented June 6, 1944

2,350,322

UNITED STATES PATENT OFFICE 2,350,322

PROCESS OF MAKING AMMONIUM SALTS OF AROMATIC COMPOUNDS

Ernst Berl and Walter George Berl, Pittsburgh, Pa.

No Drawing. Application December 4, 1939, Serial No. 307,544

14 Claims. (Cl. 52—20)

A group of chemical reactions known as topochemical reactions comprises chemical transformations whereby the original material, intermediate products and end products during the whole process never are converted into a dissolved phase. The transformation from one chemical substance to another, therefore, takes place on the same place. The following explanation may be given. Many chemical reactions are made by the transformation of one substance into another whereby the macro structure of the crystal to be converted is found exactly reproduced in the macro structure of the resulting crystal. This can be explained only by the fact that the crystal lattice of the material to be converted in its macro structure remains unchanged in the secondary material. The solid phase, therefore, is directly transformed into another solid phase without going through the intermediate stage of liquid or dissolved phase.

The object of this invention is characterised by the transformation of nitro phenols, for instance picric acid, into the corresponding ammonium salts (anilines or pyridinium compounds, etc.). This is made so that through special arrangements those nitro phenols, for instance picric acid, without changing externally the crystal arrangement, therefore without being brought into solution, are transformed directly into the corresponding solid ammonium salts; this by topochemical reactions. With the execution of such a topochemical reaction, many important advantages are combined.

The production of ammonium salts of nitro phenols, for instance of picric acid, has been made up to this time by neutralizing watery solutions of picric acid with watery solutions of ammonia. Another process introduces gaseous ammonia and air in a suspension of picric acid in water which, by the addition of direct steam, is heated to or near the boiling temperature. Through the higher solubility of ammonium picrate formed after neutralization a homogeneous solution of ammonium picrate in water results which after filtration and cooling forms smaller or larger crystals of ammonium picrate. The mother liquid of this ammonium picrate can be used according to this process for the further transformation of picric acid into ammonium picrate whereby, through the addition of damp picric acid and the use of direct steam, again a more or less saturated, hot solution of ammonium picrate is formed from which by cooling crystals of ammonium picrate result. Therefore, solutions of ammonium picrate in water are formed in all those cases. They contain about ⅓ of the salt and ⅔ of the watery solution. Rather disagreeable consequences of this process consist in the use of direct steam which increases the volume of the solution, in the large amount of time necessary for the neutralization and cooling of the more or less saturated solution of ammonium picrate, in the reduced solubility of ammonia in this hot solution, in rather large ammonia losses, and in the danger of a hydrolytic decomposition of ammonium picrate under formation of shock-sensitive picric acid.

One has tried, furthermore, to neutralize picric acid in a suspension of vegetable or animal oil with watery solutions of alkali hydroxides, or by anhydrous oxides of earth alkali metals. The oil has to take up the neutralization heat so that this neutralization process can be made, according to the inventor of that process, without danger. The oil which during this procedure certainly will be partly or completely saponified must be separated from the formed picrates by filtration. The large amount of adhering oil or decomposition products thereof have to be removed by a rather costly treatment with lower boiling substances which are non-solvents for those alkali and earth alkali picrates. Then this oil has to be separated by distillation from those lower boiling solvents. This process also uses the transformation of picric acid with watery solutions of alkali hydroxides. If solid earth alkali hydroxides are used, then the formation of earth alkali salts of picric acid does not take place. This process, which never has been carried out on a larger scale, gives very poor results. It does not use the aforementioned principle of topochemical reactions.

Different difficulties and disadvantages of older processes can be avoided by using the topochemical production of ammonium salts of nitro phenols, for instance of ammonium picrate, from picric acid in the following way.

Non-solvents for ammonium salts of nitro phenols, like methanol, ethanol, higher alcohols like glycol and glycerine, their alkyl ethers, ethers and halogenated ethers, aliphatic, aromatic and hydroaromatic hydrocarbons, chlorinated hydrocarbons like carbon tetrachloride, dichlormethane, etc., esters like ethyl ester of acetic acid and formic acid, also the butyl and amyl esters of lower fatty acids, ketones and aldehydes, phenols and hydrogenated phenols, carbon disulfide, and other appropriate materials which dissolve ammonia are saturated with ammonia gas, preferably at lower temperature ranging down to the crystallization temperature of the solvent, whereby the amount of dissolved ammonia gas increases considerably. For the same purposes one can also use a watery solution saturated with an ammonium salt of nitro phenols, for example, ammonium picrate from a former preparation which has to be saturated also with ammonia gas. In these ammonia-saturated cool solutions, dry or nearly dry nitro phenols, like picric acid, with the desired crystal size are introduced, always keeping the temperature low and the solution saturated with ammonia. Under these conditions the topochemical reaction takes place. The dissolved ammonia converts instantaneously the outer part of the picric acid crystals, or crystals of any other nitro phenol, into the corresponding ammonium salts which are insoluble in the used liquid. The ammonia diffuses continuously into the interior of the single crystals and quickly converts each nitro phenol crystal into the corresponding ammonium salt without changing the previous crystal size. This reaction takes place rather quickly so that after a short while the whole amount of nitro phenol is converted topochemically into the corresponding ammonium salt. The crystals have to be separated in the known way from the ammonia-saturated liquid which can be used immediately for the transformation of new amounts of nitro phenols into the corresponding ammonium salts. There is no use of increased temperature, no dissolution of the ammonium salts, and no time is necessary for the cooling and crystallization of these ammonium salts. Due to this topochemical reaction, the crystal size of the used nitro phenols is practically unchanged when this material is transformed into the corresponding ammonium salts. By using larger crystals of these nitro phenols which can be obtained either directly through their production, or by recrystallization of these nitro phenols with appropriate solvents like nitric acid, the desired crystal size of these nitro phenols can be obtained which afterwards give the corresponding ammonium salts of practically the same crystal size.

The charging density can be controlled and changed by the aid of the nitro phenol crystals before their topochemical transformation into the corresponding ammonium salts. In using larger crystals of picric acid, larger crystals of ammonium picrate result which allow the use of a higher charging density; in other words, of larger weight of ammonium picrate for a given unit of volume. This is an important advantage over the use of fine crystals.

This topochemical process for producing ammonium salts of nitro phenols has great advantages over the known processes. It can be carried out without any danger because the heat of neutralization of the nitro phenol is taken up by the rather large amount of cooled non-solvent for the ammonium salt. This topochemical conversion is quantitative. No untransformed nitro phenols are present which may do harm afterwards by the formation of non-shock proofed heavy metal salts by their contact with, for instance, the steel walls of a shell.

This topochemical reaction can be carried out either discontinuously or continuously. The ammonium salts separated from the liquid phase can be freed easily from the adhering non-solvent by drying it at lower temperature ranging between room temperature and the boiling point of the solvent, preferably in an atmosphere containing ammonia gas.

The same described principle, carrying out this topochemical conversion process of nitro phenols into the corresponding ammonium salts, can be used with great advantage for the formation of ammonium salts of any kind of nitro phenols, for instance making the ammonium salt of trinitrometacresol. In the same way ammonium salts of similarly constituted phenolic compounds, like nitro naphthols, can be made in a most convenient way.

This topochemical process avoids the concentration of mother liquids, the use of open steam, and the loss of larger quantities of ammonia.

One can phlegmatize the ammonium salts of nitro phenols and, therefore, make them much more shock-proof by using as non-solvents for those salts higher boiling and, therefore, viscous substances which intentionally are not completely removed from these topochemically produced ammonium salts which become insensitive against friction by shocks. These phlegmatized salts then can be transported without risk of explosion, and are exploded only by specific explosion-producing means. The phlegmatizer may be the suitably selected substance in which the ammonia is dissolved (the selection being made among substances having high boiling points); an additional phlegmatizer may, but need not necessarily be added. The addition, for instance, of viscous lubrication oils, white oil, or Vaseline (that is, a high boiling, liquid mineral oil fraction, a neutral higher member of the paraffin series), to the used non-solvent for those ammonium salts of nitro phenols has proved to be advantageous. Those ammonium salt crystals adsorb the viscous substances and become rather strongly phlegmatized.

We have also found that the above described processes work equally well with other aromatic compounds having one or more hydroxyl groups.

*Example 1*

Benzene at room temperature or cooled down near its crystallization temperature is saturated with ammonia gas. In this liquid crystals of dried picric acid with defined particle size are introduced under stirring. Ammonia gas is introduced during this operation to replace the amount of ammonia which is bound very rapidly by the picric acid which is quickly transformed into crystals of ammonium picrate which have the same crystal sizes as the used picric acid. The benzene solution remains colorless during the whole operation which is a sign that no picric acid went into solution which would color the benzene solution. After a short time the ammonium picrate is formed by this topochemical reaction. It is removed from the ammonia-saturated benzene solution which is used for a following operation of the same character. The ammonium picrate may be dried either at normal pressure or at reduced pressure at somewhat elevated temperatures, preferably in an atmosphere which contains ammonia gas. The resulting crystals are composed of pure ammonium picrate.

*Example 2*

Benzene or gasoline is saturated at room temperature with ammonia gas. Viscous substances like white oil, or Vaseline, or lubrication oil are dissolved in this ammonia-saturated solvent. Trinitrometacresol crystals of defined particle size are introduced in this system. The corresponding ammonium salt phlegmatized by incorporated viscous material is formed and treated as described in Example 1.

Example 3

In a saturated watery solution of ammonium picrate saturated with ammonia, picric acid crystals of defined particle size are introduced under stirring of the whole system and keeping the solution saturated with ammonia. In keeping this system at room temperature or below room temperature, the picric acid is transformed very quickly into the corresponding ammonium picrate without going into solution. A true topochemical reaction takes place under conservation of the particle size of the used picric acid. The crystals of ammonium picrate have to be separated in the known manner from the mother liquid which is re-used after cooling and saturation with ammonia for a following topochemical reaction. The resulting ammonium picrate crystals have to be dried preferably in ammonia gas atmosphere at low temperature, if necessary or desired, in a partial vacuum.

Example 4

For the production of ammonium phenolate a non-solvent for this substance, for instance ethyl ether, will be saturated at room temperature with ammonia gas. In this solution phenol crystals of defined crystal size are introduced, whereby this system is kept continuously saturated with ammonia. Ammonium phenolate with practically the same crystal size as the used phenol is formed which has to be separated from the ammonia-saturated non-solvent. This liquid is used for further formation of the corresponding ammonium phenolate. The very hygroscopic ammonium phenolate has to be dried in dried, warm air containing dry ammonia gas.

Other modifications of the present invention, all within the scope thereof, will readily become apparent to the expert. The scope of the present invention therefore is limited only by the appended claims.

We claim:

1. The process of making an ammonium salt of an aromatic compound comprising at least one nuclear hydroxyl group in the molecule and capable of forming an ammonium salt, comprising dissolving ammonia gas in an organic liquid having no substantial solvent effect on said ammonium salt, and contacting said ammonia solution and said aromatic compound, said aromatic compound being in the solid state; a sufficient amount of ammonia being present in said solution during said contacting step to cause the formation of said ammonium salt to be substantially instantaneous; and said process being carried out at a temperature not substantially exceeding room temperature.

2. The process of making an ammonium salt of picric acid; comprising dissolving ammonia gas in an organic liquid having no substantial solvent effect on said ammonium salt, and contacting said ammonia solution and said picric acid, said picric acid being in the solid state; a sufficient amount of ammonia being present in said solution during said contacting step to cause the formation of said ammonium salt to be substantially instantaneous; and said process being carried out at a temperature not substantially exceeding room temperature.

3. The process of making an ammonium salt of a metanitrocresol; comprising dissolving ammonia gas in an organic liquid having no substantial solvent effect on said ammonium salt, and contacting said ammonia solution and said metanitrocresol, said metanitrocresol being in the solid state; a sufficient amount of ammonia being present in said solution during said contacting step to cause the formation of said ammonium salt to be substantially instantaneous; and said process being carried out at a temperature not substantially exceeding room temperature.

4. The process of making an ammonium salt of an aromatic compound, comprising at least one nuclear hydroxyl group in the molecule and capable of forming an ammonium salt; comprising dissolving ammonia gas in the saturated watery solution of said ammonium salt, having no substantial solvent effect on said ammonium salt, and contacting said ammonia solution and said aromatic compound, said aromatic nitro compound being in the solid state; a sufficient amount of ammonia being present in said solution during said contacting step to cause the formation of said ammonium salt to be substantially instantaneous; and said process being carried out at a temperature not substantially exceeding room temperature.

5. The process of making an ammonium salt of picric acid; comprising dissolving ammonia gas in the saturated watery solution of ammonium picrate having no substantial solvent effect on said ammonium salt, and contacting said ammonia solution and said picric acid, said picric acid being in the solid state; a sufficient amount of ammonia being present in said solution during said contacting step to cause the formation of said ammonium salt to be substantially instantaneous; and said process being carried out at a temperature not substantially exceeding room temperature.

6. The process of making an ammonium salt of metanitrocresol; comprising dissolving ammonia gas in the saturated watery solution of the ammonium salt of metanitrocresol having no substantial solvent effect on said ammonium salt, and contacting said ammonia solution and said metanitrocresol, said metanitrocresol being in the solid state; a sufficient amount of ammonia being present in said solution during said contacting step to cause the formation of said ammonium salt to be substantially instantaneous; and said process being carried out at a temperature not substantially exceeding room temperature.

7. The process of making an ammonium salt of phenol; comprising dissolving ammonia gas in an organic liquid having no substantial solvent effect on said ammonium salt, and contacting said ammonia solution and said phenol, said phenol being in the solid state; a sufficient amount of ammonia being present in said solution during said contacting step to cause the formation of said ammonium salt to be substantially instantaneous; and said process being carried out at a temperature not substantially exceeding room temperature.

8. The process of making an ammonium salt of a phenol; comprising dissolving ammonia gas in the saturated watery solution of said phenol having no substantial solvent effect on said ammonium salt, and contacting said ammonia solution and said phenol, said phenol being in the solid state; a sufficient amount of ammonia being present in said solution during said contacting step to cause the formation of said ammonium salt to be substantially instantaneous; and said process being carried out at a temperature not substantially exceeding room temperature.

9. The process of making an ammonium salt of an aromatic nitro compound comprising at least one nuclear hydroxyl group in the molecule and capable of forming an ammonium salt, comprising dissolving ammonia gas in an organic liquid having no substantial solvent effect on said ammonium salt, and contacting said ammonia solution and said aromatic nitro compound, said aromatic nitro compound being in the solid state; a sufficient amount of ammonia being present in said solution during said contacting step to cause the formation of said ammonium salt to be substantially instantaneous; and said process being carried out at a temperature not substantially exceeding room temperature.

10. The process of making an ammonium salt of an aromatic nitro compound comprising at least one nuclear hydroxyl group in the molecule and capable of forming an ammonium salt; comprising dissolving ammonia gas in the saturated watery solution of said ammonium salt having no substantial solvent effect on said ammonium salt, and contacting said ammonia solution and said aromatic nitro compound, said aromatic nitro compound being in the solid state; a sufficient amount of ammonia being present in said solution during said contacting step to cause the formation of said ammonium salt to be substantially instantaneous; and said process being carried out at a temperature not substantially exceeding room temperature.

11. In the process according to claim 1, the step of separating the said formed ammonium salt from said solution, said step comprising drying said salt in the presence of ammonia gas.

12. The process of making a phlegmatized and substantially shockproof ammonium salt of an aromatic nitro compound comprising at least one nuclear hydroxyl group in the molecule and capable of forming an ammonium salt; comprising forming a reaction medium by dissolving ammonia gas in a viscous organic substance selected from the group consisting of neutral higher members of the paraffin series, petroleum jellies and viscous lubrication oils having no substantial solvent effect on said ammonium salt and having a high boiling point, contacting said reaction medium and said aromatic nitro compound, said aromatic nitro compound being in the solid state, and incompletely removing said reaction medium; a sufficient amount of ammonia being present in said reaction medium during said contacting step to cause the formation of said ammonium salt to be substantially instantaneous; and said process being carried out at a temperature not substantially exceeding room temperature.

13. The process of making a phlegmatized and substantially shockproof ammonium salt of an aromatic nitro compound having at least one nuclear hydroxyl group in the molecule and capable of forming an ammonium salt; comprising adding to an organic liquid capable of dissolving ammonia, but having no substantial solvent effect on said ammonium salt, a viscous organic substance selected from the group consisting of neutral higher members of the paraffin series, petroleum jellies and viscous lubrication oils having no substantial solvent effect on said ammonium salt and having a high boiling point, forming a reaction medium by dissolving therein ammonia gas, contacting said reaction medium and said aromatic nitro compound, and substantially removing said first-named organic liquid adhering to the formed ammonium salt from said salt, while allowing said second-named viscous organic substance to remain substantially occluded in said salt; a sufficient amount of ammonia being present in said reaction medium during said contacting step to cause the formation of said ammonium salt to be substantially instantaneous; and said process being carried out at a temperature not substantially exceeding room temperature.

14. In the process according to claim 13, the step of substantially removing said first-named organic liquid adhering to the formed ammonium salt; comprising drying said salt in the presence of ammonia gas.

ERNST BERL.
WALTER GEORGE BERL.